JOHN S. SANSON.

Improvement in Car-Axle Lubricators.

No. 4,880. Reissued April 23, 1872.

*Witnesses:*
Fred Haynes
Benj. S. Sharp.

John S. Sanson

AM. PHOTO-LITHOGRAPHIC CO. N.Y. (OSBORNE'S PROCESS.)

UNITED STATES PATENT OFFICE.

JOHN S. SANSON, OF MORRISANIA, NEW YORK, ASSIGNOR OF PART INTEREST TO CHARLES METTAM.

IMPROVEMENT IN CAR-AXLE LUBRICATORS.

Specification forming part of Letters Patent No. 122,495, dated January 2, 1872; reissue No. 4,880, dated April 23, 1872.

*To all whom it may concern:*

Be it known that the following is a full, clear, and exact description of an Improvement in Lubricators for Car-Axles, invented by JOHN S. SANSON, of Morrisania, in the county of Westchester and State of New York, reference being had to the accompanying drawing forming part of this specification, and in which—

Figure 1:
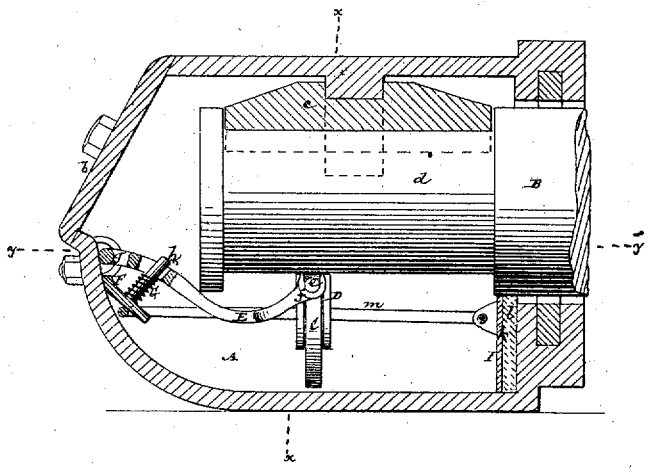
Figure 2:
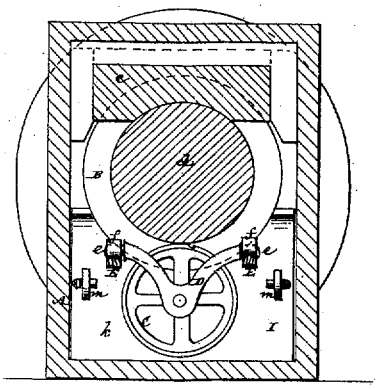
Figure 3:
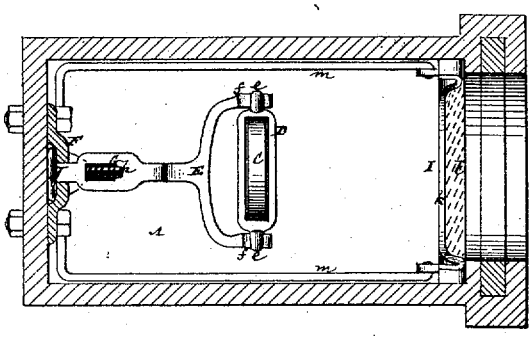

Figure 1 represents a vertical section, in direction of the length of the axle, of a railroad-car axle-box, showing the one end of the axle in full and with the improvement applied thereto; Fig. 2, a transverse section of the same at the line *x x* in Fig. 1; and Fig. 3, a horizontal section at the line *y y* with the axle removed.

Similar letters of reference indicate corresponding parts throughout the several figures of the drawing.

The invention relates to revolving lubricators composed of a wheel arranged to bear up against the journal of the axle, and serving, as it is rotated by frictional contact therewith, to convey the lubricating material to the journal. This invention, or the one part of it, comprises a pivoted or swinging rod, clasp-plate, and spring, together with a pivoted or swinging hanger for carrying the lubricating-wheel, the whole being arranged substantially as hereinafter described, and the pivoted or swinging rod either being steadied and guided by a pin or projection attached to the clasp-plate to direct said rod and wheel, or being free to act independent of such guide. By this construction every facility is afforded for insertion and removal of the lubricator within and from the box through the usual opening in its front, used to introduce the lubricating material—and this when the axle is in its place—whereby the revolving lubricator may be applied to both old and new axle-boxes, including boxes not especially constructed to receive the same, and so that an opening in the bottom of the box for insertion and removal of the lubricator, also numerous bolts or fastenings liable to work loose, are dispensed with, and a perfect action, generally, is obtained. The invention also includes a combined pad and wiper, of novel construction, for preventing the washing or working of the lubricating material along the axle beyond the journal and out of the box, thereby contributing to the economy and efficiency of the lubricator.

Referring to the accompanying drawing, A represents a railroad-car axle-box of ordinary construction, provided with the usual front opening for introduction of the lubricating material, an outside or end lid, *b*, for closing said opening, and an upper brass, *c*. B is the axle, and *d* its journal within the box A. C is the lubricating-wheel, arranged within the box A, beneath the journal, and serving, as it is rotated by frictional contact with the latter, to convey the oil placed in the bottom of the box to the journal. This wheel is carried by a hanger, D, pivoted beyond or above its center, on opposite sides, as at *e e*, to the inner jaw-like end of a main carrying-arm or rod, E, the pivots *e e* occupying a transverse relation with the axis of the wheel and that of the car-axle and fitting into bearings *f f* in the jaw-end of the rod or arm E. The outer end of this rod or arm is pivoted or hinged in proximity to the front end of the box A by means of a cross-pin or pivot, *g*, carried by a clasp or supporting plate, F, to provide for the adjustment of the wheel C up to or against the journal, said plate being suitably secured to the box. A spring, G, of any suitable kind, serves, by its action on or against the arm E, to adjust or force the wheel up against the journal. Said spring is here shown, for convenience sake, of spiral construction, and as arranged round a pin or projection, *h*, attached to the clasp-plate F, and passing through a slot in the rod or arm E to assist in steadying and directing said arm with its attached wheel.

By the pivoted suspension of the wheel C through its hanger, as at *e e*, which admits of the wheel being swung so that its face is on a level or thereabout with the axial line of the joint or pivot *g* of the arm E, every facility is afforded for the entry and attachment of the lubricator within the box when the axle is in its place; likewise, of its removal therefrom through the opening covered by the plate or lid *b*, even though the space between the outer collar of the axle and front end of the box be as contracted as it usually is. Thus the lubricator may be applied to axle-boxes now in use without disturbing them or their axles, and when in place its action is perfect.

To prevent waste of the oil, consequent upon its washing or being carried out of the box along the axle beyond the journal by the lateral motion of the cars, there is arranged within the box, at its back end, a combined pad and wiper, I, arranged to bear against the lower portion of the body of the axle, in proximity to its journal, and composed in part of a plate, *k*, and piece or pieces of felting, *l*, or other suitable material, the same serving to wipe off the oil after it has passed from the journal and preventing it from running along the axle; also returning it again to the bottom of the box. To facilitate the entry of this pad and wiper, and proper adjustment and retention of it, the plate *k* has pivoted to it a wire bow or handle, *m*, whereby the device may be readily projected through the opening covered by the lid *b*, and by the fit of the bowed end of the handle *m* under the clasp-plate F, said pad and wiper is securely held to its place; also every facility afforded for its removal, when required. By means of this pad and wiper the usual waste by leakage of oil, as hereinbefore referred to, is avoided, and but a small quantity of oil in the box will suffice to keep the lubricator fully supplied, thereby doing away with many evils consequent upon the lubricator running short of oil.

What is here claimed, and desired to be secured by Letters Patent, is—

1. The combination of the pivoted or swinging rod E, the clasp-plate F, the spring G, the pivoted or swinging hanger D, and the wheel C, the whole being arranged for operation essentially as and for the purpose herein set forth.

2. The combination of the steadying-pin or projection *h* with the spring G, the pivoted or swinging arm E, the pivoted or swinging hanger D, and the wheel C, essentially as specified.

3. The pad and wiper I, composed of a plate, *k*, and felting *l*, in combination with the hinged or pivoted bowed handle *m* for operation within the box, substantially as described.

Witnesses: JOHN S. SANSON.

FRED HAYNES,

FERD. TUSCH.